(12) United States Patent
Knyshev

(10) Patent No.: US 9,699,253 B2
(45) Date of Patent: Jul. 4, 2017

(54) MOBILE PRODUCT AND SERVICE INFORMATION MANAGEMENT

(71) Applicant: EMC Corporation, Hopkinton, MA (US)

(72) Inventor: Igor O. Knyshev, Saint-Petersburg (RU)

(73) Assignee: EMC IP Holding Company LLC, Hopkinton, MA (US)

( * ) Notice: Subject to any disclaimer, the term of this patent is extended or adjusted under 35 U.S.C. 154(b) by 174 days.

(21) Appl. No.: 14/155,596

(22) Filed: Jan. 15, 2014

(65) Prior Publication Data
US 2014/0280455 A1    Sep. 18, 2014

(30) Foreign Application Priority Data

Mar. 13, 2013 (RU) ................................ 2013111321

(51) Int. Cl.
*G06F 15/16* (2006.01)
*H04L 29/08* (2006.01)

(52) U.S. Cl.
CPC .......... *H04L 67/1097* (2013.01); *H04L 67/04* (2013.01)

(58) Field of Classification Search
CPC .... H04L 67/04; H04L 67/1097; H04L 67/104
USPC ........................................................ 709/202
See application file for complete search history.

(56) References Cited

U.S. PATENT DOCUMENTS

| | | | |
|---|---|---|---|
| 2013/0066675 A1* | 3/2013 | Bercaw | G06Q 30/0201 705/7.29 |
| 2013/0080251 A1* | 3/2013 | Dempski | G06Q 30/01 705/14.53 |
| 2013/0110678 A1* | 5/2013 | Vigier | G06Q 30/06 705/26.61 |
| 2013/0268405 A1* | 10/2013 | Yeh | G06Q 30/06 705/26.61 |
| 2014/0143063 A1* | 5/2014 | Marino | G06Q 30/0641 705/14.66 |

OTHER PUBLICATIONS

P. Mell et al., "The NIST Definition of Cloud Computing," U.S. Department of Commerce, Computer Security Division, National Institute of Standards and Technology, Special Publication 800-145, Sep. 2011, 7 pages.

* cited by examiner

*Primary Examiner* — June Sison
*Assistant Examiner* — Adam Cooney
(74) *Attorney, Agent, or Firm* — Ryan, Mason & Lewis, LLP

(57) ABSTRACT

Information processing techniques for improving access to product and service information associated with a business entity. For example, a method comprises the following steps. A plurality of dedicated information modules is maintained in a repository. At least a portion of the plurality of dedicated information modules each comprises information specifically relating to at least one of a given product and a given service of an entity. One or more of the plurality of dedicated information modules is identified based on one or more input selection criteria. The identified one or more dedicated information modules are stored in a mobile storage container. The mobile storage container is transferred to a mobile device.

14 Claims, 3 Drawing Sheets

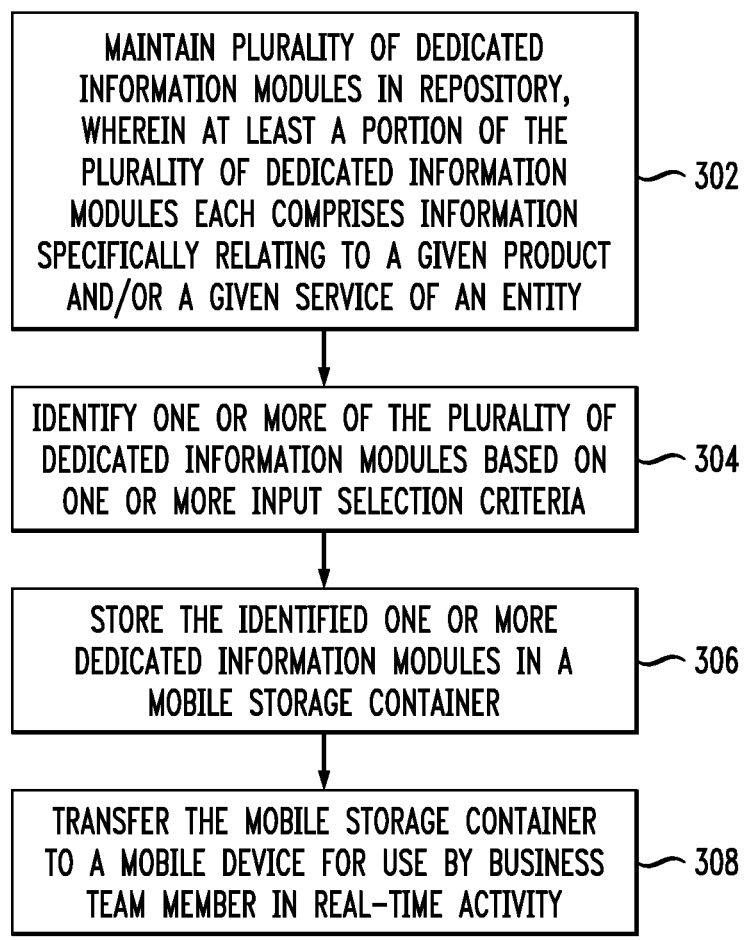

MOBILE PRODUCT AND SERVICE INFORMATION MANAGEMENT

FIELD

The field relates to information processing, and more particularly to information processing techniques for managing access to product and service information associated with a business entity.

BACKGROUND

Managing access to information relating to products and services of a business entity, especially one that is geographically distributed, is a difficult task. A business team member of the business entity typically prepares for a customer presentation by searching for and accessing information about specific products and services that he/she may be pitching during the customer presentation. However, often times, a member of the business team is left trying to determine where he/she can find needed technical and/or cost information about a particular product or service.

Furthermore, the business team member may be faced with unanticipated questions at the customer presentation. Such unanticipated questions can cause the business team member to have to conduct further research at a later time, thereby delaying an answer to the potential customer. Such a delay may decrease the likelihood of the sales pitch being successful.

Accordingly, the lack of real-time, easily accessible product and service information for a business team member can lead to customer churn, lost revenue and sales order losses for the business entity.

SUMMARY

Embodiments of the present invention provide information processing techniques for managing access to product and service information associated with a business entity.

For example, in one embodiment, a method comprises the following steps. A plurality of dedicated information modules is maintained in a repository. At least a portion of the plurality of dedicated information modules each comprises information specifically relating to at least one of a given product and a given service of an entity. One or more of the plurality of dedicated information modules is identified based on one or more input selection criteria. The identified one or more dedicated information modules are stored in a mobile storage container. The mobile storage container is transferred to a mobile device.

In another embodiment, a computer program product is provided which comprises a processor-readable storage medium having encoded therein executable code of one or more software programs. The one or more software programs when executed by a processor device implement steps of the above-described method.

In yet another embodiment, an apparatus comprises a memory and a processor operatively coupled to the memory and configured to perform steps of the above-described method.

Advantageously, embodiments of a mobile product and service information management system described herein serve to reduce customer churn, lost revenue and sales order losses. Furthermore, the system provides a business entity with an advantage by empowering its business team members in the field to be able to access necessary or desired data during real-time business negotiations so as to increase business deal success rates. The system can be used by customers as well.

These and other features and advantages of the present invention will become more readily apparent from the accompanying drawings and the following detailed description.

BRIEF DESCRIPTION OF THE DRAWINGS

FIG. 3 shows a mobile product and service information management methodology in accordance with one embodiment of the invention.

DETAILED DESCRIPTION

Embodiments of the present invention will be described herein with reference to exemplary information processing systems, computing systems, data storage systems and associated servers, computers, storage units and devices and other processing devices. It is to be appreciated, however, that embodiments of the invention are not restricted to use with the particular illustrative system and device configurations shown. Moreover, the phrases "information processing system," "computing system" and "data storage system" as used herein are intended to be broadly construed, so as to encompass, for example, private or public cloud computing or storage systems, as well as other types of systems comprising distributed virtual infrastructure. However, a given embodiment may more generally comprise any arrangement of one or more processing devices.

As used herein, the term "cloud" refers to a collective computing infrastructure that implements a cloud computing paradigm. For example, as per the National Institute of Standards and Technology (NIST Special Publication No. 800-145), cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction.

Further, as used herein, the phrase "data object" or simply "object" refers to any given data item or data unit that may be part of an information network. An object or data object may take on any form and it is to be understood that the invention is not limited to any particular form. For example, an object may be electronic data such as one or more web pages, documents, presentations, files, images, videos, electronic mail (email), or any other type of data set, data item, or data unit. Thus, embodiments of the invention are not limited to any particular type of data object.

Figure 1:
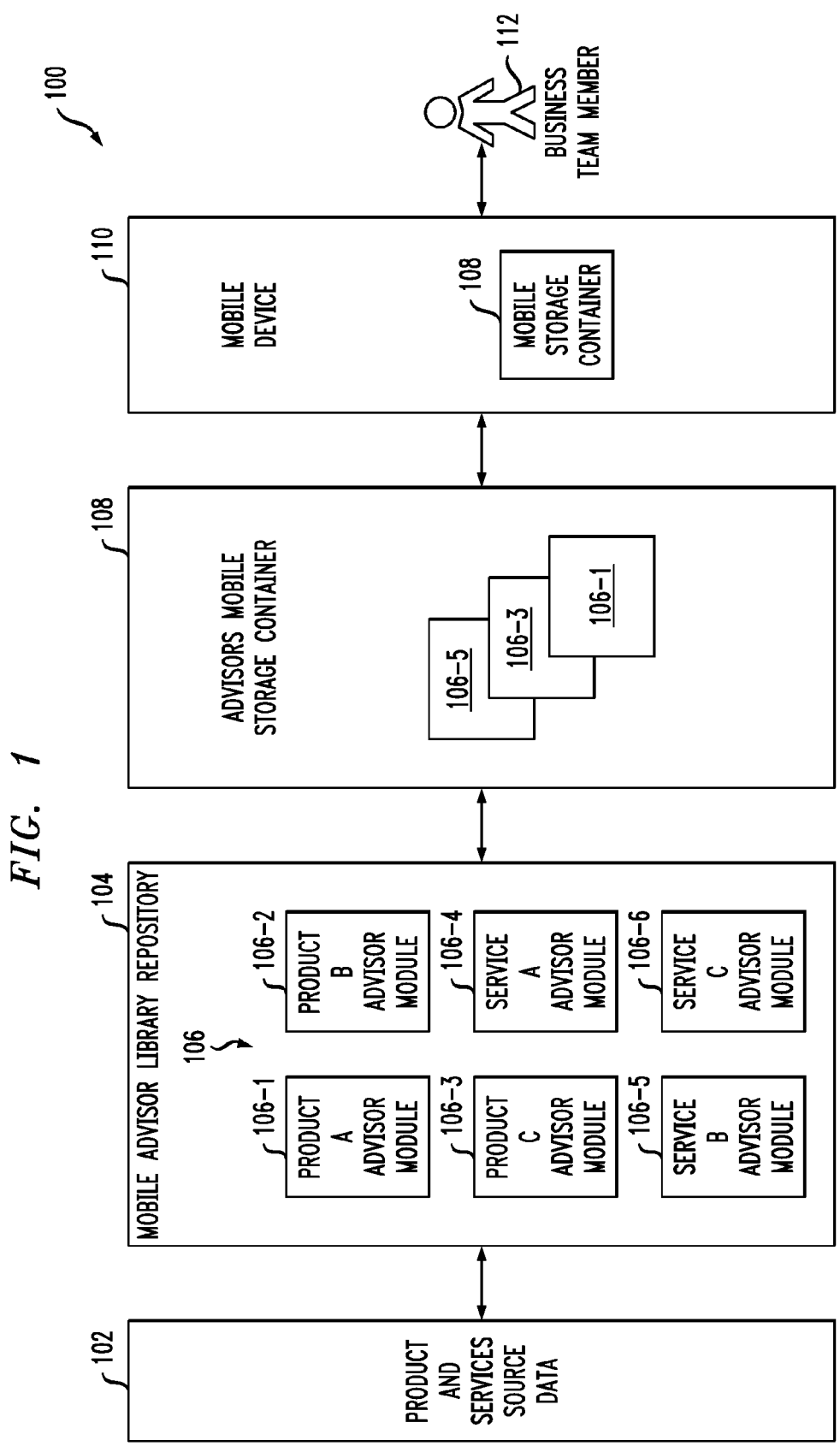
FIG. 1 shows a mobile product and service information management system in accordance with one embodiment of the invention.

FIG. 1 shows a mobile product and service information management system 100 configured in accordance with an illustrative embodiment of the present invention. The system 100 comprises a product and services source data store 102, a mobile advisor library repository 104, an advisors mobile storage container 108, and a mobile device 110. A business team member 112 is the user of the system in this embodiment. However, as mentioned, a customer of the business entity could be the user in an alternative embodiment.

As used herein, the term "advisor" is intended to refer to an example of a dedicated information module, such as an application program or applet, which contains information specifically relating to at least one of a given product and a given service of the business entity. Such information may include, but is not limited to, technical information on a product or service, cost information for a product or service, and/or presentation information on a product or service. However, the advisor can include additional information as well. That is, the advisor for a particular product or service can contain one or more data objects (e.g., web pages, documents, files, reports, brochures, images, videos, email, etc.) pertaining to the product or service.

For example, as shown in repository 104, advisor modules 106 for product A (106-1), product B (106-2), product C (106-3), service A (106-4), service B (106-5) and service C (106-6) are shown as being stored therein. The repository 104 can contain more or less advisor modules than what is shown in FIG. 1. The particular products and services will, of course, depend on the business entity. That is, when the user 112 is a business team member, the product advisor modules and services advisor modules will pertain to products and services of the business entity for which the user is a team member. However, the repository 104 is also configured to store advisor modules associated with products and services of competitors or business partners of the given business entity. At least a portion of the information stored in an advisor module 106 may be harvested or otherwise obtained from one or more data sources (collectively data store 102 in FIG. 1), which may be remote from or collocated with the repository 104. For example, such data sources may include, but are not limited to, websites and other electronic data sources containing such information.

Examples of products and services in a cloud infrastructure based data storage business environment may include, but are not limited to, virtualized data storage platform products and services, network storage products and services, enterprise storage products and services, "big data" solution products and services, etc. As is known, "big data" refers to data sets whose size is so large as to be beyond the ability of commonly used software tools to manage/process the data within a suitable time frame. Thus, such products and services may include big data analytics solutions.

As will be explained further below in the context of FIG. 3, the user 112 either directly identifies one or more of the advisor modules 106 stored in repository 104 of which he/she is interested, or performs a keyword search for appropriate advisor modules. In either scenario, one or more of the advisor modules 106 are identified based on an input selection criteria presented by the user 112.

The identified advisor modules are copied and stored in the mobile storage container 108. In the example shown in FIG. 1, advisor modules 106-1, 106-3 and 106-5 are stored in the mobile container. The mobile storage container can be one or more electronic data folders or files, or one or more other electronic data structures. It is to be understood that the user 112 can enter the input selection criteria at one or more servers managed by the business entity (e.g., the one or more servers that maintain the mobile advisor library repository 104). Alternatively, the user 112 can enter the input selection criteria via his/her mobile device 110 which is in communication (wired or wireless) with the one or more servers of the business entity. Examples of such a mobile device includes, but are not limited to, a cellular phone or smartphone, a tablet, a laptop computer or other personal computer, and a personal digital assistant.

The mobile storage container 108 with the identified advisor modules is initially resident on the one or more servers of the business entity. It is then transferred (e.g., downloaded) to the mobile device 110 of the user. Thus, the user 112 now has the product/service information that he/she needs in a mobile form so that he/she has it available in real-time when making a sales pitch or other presentation at a remote location.

Although the system elements 102 through 110 are shown as separate elements in FIG. 1, these elements or portions thereof may be implemented at least in part on a common processing platform. In other embodiments, one or more of the system elements 102 through 110 may each be implemented on a separate processing platform, such as the processing platform to be described below in conjunction with FIG. 2. By way of example only, the data store 102 may be implemented on a first processing device of a first processing platform, the repository 104 may be implemented on a second processing device of a second processing platform, and the mobile storage container 108 may be implemented on a third processing device of a third processing platform. The other system elements may be implemented on one or the other of these processing devices/platforms, or on one more other processing devices/platforms. It is also to be understood that a given embodiment of the system 100 may include multiple instances of the elements 102 through 110, although only single instances of such elements are shown in the system diagram for clarity and simplicity of illustration.

Figure 2:
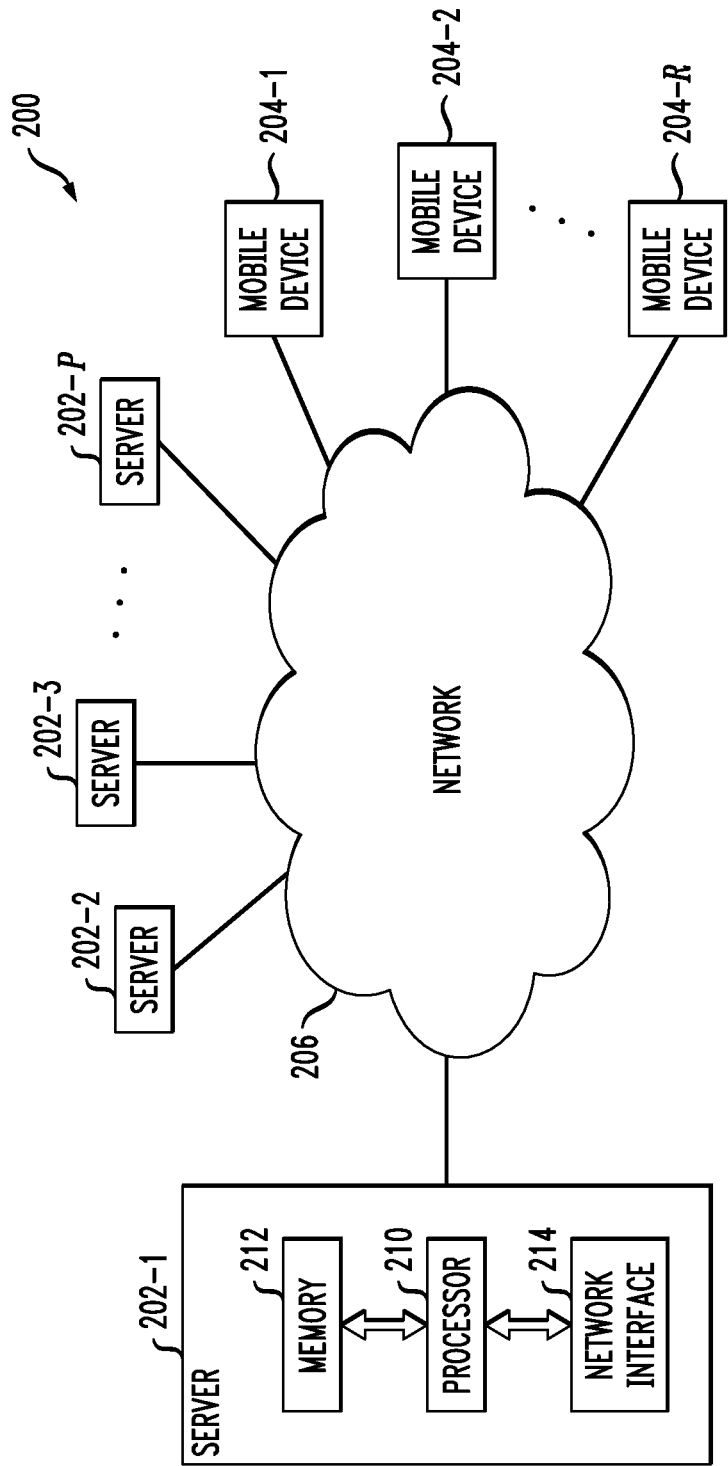
FIG. 2 shows a distributed information processing platform on which the mobile product and service information management system of FIG. 1 is implemented in accordance with one embodiment of the invention.

An example of a processing platform on which the mobile product and service information management system 100 of FIG. 1 may be implemented is information processing platform 200 shown in FIG. 2. The processing platform 200 in this embodiment comprises at least a portion of the system 100 and includes a plurality of servers, denoted 202-1, 202-2, 202-3, . . . 202-P, and a plurality of mobile devices, denoted 204-1, 204-2, 204-3, . . . 204-R, which are configured to communicate with one another over a network 206. One or more of the elements of system 100 may therefore each run on a server, computer or other processing platform element, which may be viewed as an example of what is more generally referred to herein as a "processing device." Further, mobile device 110 in FIG. 1 may correspond to one of the mobile devices 204 in FIG. 2, each which may also be generally referred to herein as a "processing device."

As illustrated in FIG. 2, such a device generally comprises at least one processor and an associated memory, and implements one or more functional modules for controlling certain features of system 100. Again, multiple elements or modules may be implemented by a single processing device in a given embodiment.

The server 202-1 in the processing platform 200 comprises a processor 210 coupled to a memory 212. The processor 210 may comprise a microprocessor, a microcontroller, an application-specific integrated circuit (ASIC), a field programmable gate array (FPGA) or other type of processing circuitry, as well as portions or combinations of such circuitry elements. The memory 212 may be viewed as an example of what is more generally referred to herein as a "computer program product." A computer program product comprises a processor-readable storage (non-transitory) medium having encoded therein executable code of one or more software programs. Such a memory may comprise electronic memory such as random access memory (RAM), read-only memory (ROM) or other types of memory, in any combination. The computer program code when executed by a processing device such as the server 202-1 causes the device to perform functions associated with one or more of the elements of system 100. One skilled in the art would be readily able to implement such software given the teachings provided herein. Other examples of computer program products embodying embodiments of the invention may include, for example, optical or magnetic disks.

Also included in the server 202-1 is network interface circuitry 214, which is used to interface the server with the network 206 and other system components. Such circuitry may comprise conventional transceivers of a type well known in the art.

The other servers 202 and mobile devices 204 of the processing platform 200 are assumed to be configured in a manner similar to that shown for server 202-1 in the figure.

The processing platform 200 shown in FIG. 2 may comprise additional known components such as batch processing systems, parallel processing systems, physical machines, virtual machines, virtual switches, storage volumes, etc. Again, the particular processing platform shown in the figure is presented by way of example only, and system 200 may include additional or alternative processing platforms, as well as numerous distinct processing platforms in any combination.

Also, numerous other arrangements of servers, computers, storage devices or other components are possible in system 200. Such components can communicate with other elements of the system 200 over any type of network, such as a wide area network (WAN), a local area network (LAN), a satellite network, a telephone or cable network, or various portions or combinations of these and other types of networks.

Furthermore, it is to be appreciated that the processing platform 200 of FIG. 2 can comprise virtual machines (VMs) implemented using a hypervisor. A hypervisor is an example of what is more generally referred to herein as "virtualization infrastructure." The hypervisor runs on physical infrastructure. As such, the mobile product and service information management techniques illustratively described herein can be provided as one or more cloud services. The cloud services thus run on respective ones of the virtual machines under the control of the hypervisor. Processing platform 200 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

An example of a commercially available hypervisor platform that may be used to implement portions of the processing platform 200 in one or more embodiments of the invention is the VMware® vSphere™ which may have an associated virtual infrastructure management system such as the VMware® vCenter™. The underlying physical infrastructure may comprise one or more distributed processing platforms that include storage products such as VNX and Symmetrix VMAX, both commercially available from EMC Corporation of Hopkinton, Mass. A variety of other computing and storage products may be utilized to implement at least a portion of the cloud services.

FIG. 3 shows a mobile product and service information management methodology 300 in accordance with one embodiment of the invention. Methodology 300 is one example of a methodology that can be performed in accordance with the elements of the system 100 in FIG. 1.

Thus, in step 302, the methodology maintains a plurality of dedicated information modules (e.g., advisor modules 106-1 through 106-6) in a repository (e.g., library 104). The repository can be constantly updated, with new information modules being added and existing ones being modified and/or deleted. As mentioned above, at least a portion of the plurality of dedicated information modules each comprises information specifically relating to a given product and/or a given service of an entity. In step 304, one or more of the plurality of dedicated information modules is identified based on one or more input selection criteria. For example, as mentioned above, this may be a search criteria entered by the user 112 via his/her mobile device 110 or directly to the repository 104.

In step 306, the identified one or more dedicated information modules are stored in a mobile storage container (e.g., mobile storage container 108). The mobile storage container is then transferred (e.g., downloaded) to a mobile device (e.g., mobile device 110), in step 308, for use by the user (e.g., business team member) in real-time activity (e.g., business presentation at customer location).

Advantageously, in a business environment, the mobile product and service information management system and methodology may be considered to provide a "mobile toolbox" to users. The system and methodology increases workforce productivity by allowing sales people to prepare the individual sets of advisors and put them into his/her portfolio (storage container). Furthermore, the system and methodology allows for a business entity to provide this functionality to partners/sales force to provide seamless access to the latest information on products and solutions available from the business entity. The system and methodology also serves as a reference tool for customers of the business entity in that the customers will now have the ability to leverage the mobile toolbox to review presentations/overviews on products and solutions.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:
1. A method comprising the steps of:
maintaining a plurality of dedicated information modules comprising one or more first modules and one or more second modules in a repository of a first entity, wherein the first modules each comprise information specifically relating to at least one of a given first entity product and a given first entity service provided by the first entity, wherein the second modules each comprise information specifically relating to at least one of a given second entity product and a given second entity service provided by a second entity, and wherein the second entity is one of a competitor and a partner of the first entity;

identifying one or more of the plurality of dedicated information modules based on input selection criteria provided by a member of the first entity for use during a presentation relating to at least one of the given first entity product and the given first entity service given by the member of the first entity directly to a customer, wherein the input selection criteria comprise search criteria including at least one organizational criterion, and wherein the at least one organizational criterion is based on the member of the first entity requesting information about at least one of the given first entity product and the given first entity service during the presentation;

storing the identified one or more dedicated information modules in a mobile storage container configured to hold the identified one or more dedicated information modules, wherein the mobile storage container is a data structure customized by the member of the first entity and due to the input selection criteria; and transferring, following storing the identified one or more dedicated information modules, the mobile storage container to a mobile device of the member of the first entity operatively coupled to the repository via a communication network so as to enable the mobile device to present to the member of the first entity at least a portion of the identified one or more dedicated information modules in accordance with the presentation;

wherein the at least a portion of the identified one or more dedicated information modules being presented in accordance with the presentation are updated contemporaneous to a time of the presentation; and wherein the maintaining, identifying, storing and transferring steps are executed via at least one processor device.

2. The method of claim 1, further comprising generating the plurality of dedicated information modules from one or more data sources.

3. The method of claim 1, wherein the repository for maintaining the plurality of dedicated information modules comprises at least one server managed by the first entity.

4. The method of claim 1, wherein at least one of the plurality of dedicated information modules comprises an application program.

5. A computer program product comprising a processor-readable storage medium having encoded therein executable code of one or more software programs, wherein the one or more software programs when executed by the at least one processor device implement the steps of the method of claim 1.

6. A method comprising the step of:

downloading a mobile storage container to a mobile device of a member of a first entity, wherein the mobile storage container comprises one or more of a plurality of dedicated information modules obtained from a repository of the first entity and identified for use during a presentation given by the member of the first entity directly to a customer and based on input selection criteria provided by the member of the first entity, wherein the input selection criteria comprise search criteria including at least one organizational criterion;

wherein the plurality of information modules comprises one or more first modules and one or more second modules, wherein the first modules each comprise information specifically relating to at least one of a given first entity product and a given first entity service provided by the first entity, wherein the second modules each comprise information specifically relating to at least one of a given second entity product and a given second entity service provided by a second entity, and wherein the second entity is one of a competitor and a partner of the first entity;

wherein the presentation relates to at least one of the given first entity product and the given first entity service, and wherein the at least one organizational criterion is based on the member of the first entity requesting information about at least one of the given first entity product and the given first entity service during the presentation;

wherein the mobile storage container is configured to hold the identified one or more dedicated information modules and stores the identified one or more dedicated information modules;

wherein the mobile storage container is a data structure customized by the member of the first entity and due to the input selection criteria;

wherein downloading the mobile storage container to the mobile device is performed after the identified one or more dedicated information modules are stored in the mobile storage container;

wherein the mobile device is operatively coupled to the repository via a communication network so as to enable the mobile device to present to the member of the first entity at least a portion of the identified one or more dedicated information modules in accordance with the presentation;

wherein the at least a portion of the identified one or more dedicated information modules being presented in accordance with the presentation are updated contemporaneous to a time of the presentation; and wherein the downloading step is executed via at least one processor device.

7. An apparatus comprising:

a memory; and a processor operatively coupled to the memory and configured to: maintain a plurality of dedicated information modules comprising one or more first modules and one or more second modules in a repository of a first entity stored in the memory, wherein the first modules each comprise information specifically relating to at least one of a given first entity product and a given first entity service provided by the first entity, wherein the second modules each comprise information specifically relating to at least one of a given second entity product and a given second entity service provided by a second entity, and wherein the second entity is one of a competitor and a partner of the first entity; identify one or more of the plurality of dedicated information modules based on input selection criteria provided by a member of the first entity for use during a presentation relating to at least one of the given first entity product and the given first entity service given by the member of the first entity directly to a customer, wherein the input selection criteria comprise search criteria including at least one organizational criterion, and wherein the at least one organizational criterion is based on the member of the first entity requesting information about at least one of the given first entity product and the given first entity service during the presentation; store the identified one or more dedicated information modules in a mobile storage container configured to hold the identified one or more dedicated information modules, wherein the mobile storage container is a data structure customized by the member of the first entity and due to the input selection criteria; and transfer, following storing the identified one or more dedicated information modules, the mobile storage container to a mobile device of the member of the first entity operatively coupled to the repository via a communication network so as to enable the mobile device to present to the member of the first entity at least a portion of the identified one or more dedicated information modules in accordance with the presentation, wherein the at least a portion of the identified one or more dedicated information modules being presented in accordance with the presentation are updated contemporaneous to a time of the presentation.

8. The apparatus of claim 7, wherein the processor is further configured to generate the plurality of dedicated information modules from one or more data sources.

9. The apparatus of claim 7, wherein the processor and the memory is part of at least one server managed by the first entity.

10. The apparatus of claim 7, wherein at least one of the plurality of dedicated information modules comprises an application program.

11. The method of claim 6, further comprising generating the plurality of dedicated information modules from one or more data sources.

12. The method of claim 6, wherein the repository for maintaining the plurality of dedicated information modules comprises at least one server.

13. The method of claim 12, wherein the at least one server is managed by the first entity.

14. The method of claim 12, wherein at least one of the plurality of dedicated information modules comprises an application program.

* * * * *